3,068,272
CYCLOHEPTATRIENES HAVING IMINO AND BORON-SUBSTITUTED AMINO GROUPS

Howard Emil Holmquist, Wilmington, Del., assignor to E. I. du Pont de Nemours and Company, Wilmington, Del., a corporation of Delaware
No Drawing. Filed July 10, 1959, Ser. No. 826,127
16 Claims. (Cl. 260—462)

This invention relates to new substituted cycloheptatrienes and to methods of making the same.

The novel compounds of the invention are derivatives of cycloheptatriene having nitrogen atoms attached to adjacent nuclear carbons and at least one of the nitrogens directly bonded to boron. Preferably these new compounds are 7-imino-1,3,5-cycloheptatrienylamino compounds having boron directly bonded to amino nitrogen, with the other two formal valence bonds of boron attached to aliphatically saturated hydrocarbon (i.e., a hydrocarbon group in which any unsaturation is aromatic), alkoxy, hydroxy, or halogen. Such new compounds are obtained by reaction of 1-amino-7-imino-1,3,5-cycloheptatrienes with a boron compound having hydroxy, halogen, alkoxy or aliphatically saturated hydrocarbon groups directly bonded to boron.

The following examples, in which the parts are by weight, further illustrate the preparation of new cycloheptatrienylaminoboron compounds of this invention.

EXAMPLE I

*Ethoxyphenyl-[7-Imino-1,3,5-Cycloheptatrienylamino] Borine*

A solution of 1 g. of 1-amino-7-imino-1,3,5-cycloheptatriene hemihydrate and 1.4 g. of diethyl benzeneboronate in 50 ml. of benzene was refluxed for 24 hours. There was obtained a dark solid which was recrystallized from chloroform-petroleum ether to give 0.4 g. (20%) of yellow crystals (turning orange above 100° C.). After a second recrystallization, the ethoxyphenyl-[7-imino-1,3,5-cycloheptatrienylamino]borine had a M.P. 253° C. with dec.

*Analysis.*—Calcd. for $C_{15}H_{17}ON_2B$: C, 72.03; H, 6.85; N, 11.20; B, 4.33. Found: C, 72.18; H, 6.76; N, 11.06; B, 4.27.

The 1-amino-7-imino-1,3,5-cycloheptatriene was obtained as follows:

A solution containing 33.2 parts of a mixture of fluorocarbons containing 50% of 1,1,2,2-tetrafluorocycloheptadiene (as a mixture of isomers with unsaturation in the 3,5- or 3,6-positions) in 40 parts of methanol was combined with an ice cold saturated solution of anhydrous ammonia in 40 parts of methanol. The temperature of this mixture was maintained below 30° C. by cooling in ice until the temperature no longer showed a tendency to rise. The resulting mixture which contained precipitated ammonium fluoride was cooled and diluted with an equal volume of ether and the ammonium fluoride filtered off. Evaporation of the methanol-ether solvents by reduce dpressure left a reddish brown oil which was triturated with ether to yield 2.8 parts of the yellow solid hydrofluoride salt of 1-amino-7-imino-1,3,5-cycloheptatriene, M.P. (dec.) 190°C. Infrared analysis of this compound confirmed the proposed structure.

The free base was obtained by neutralizing a water solution of the hydrofluoride with 20% sodium hydroxide to precipitate the yellow hemihydrate of 1-amino-2-imino-1,3,5-cycloheptatriene, M.P. (dec.) 112–113° C. Sublimation produced a sample melting at 113–114° C. with decomposition.

*Analysis.*—Calcd. for $C_7H_8N_2 \cdot \frac{1}{2}H_2O$: C, 65.10; H, 7.02; N, 21.70. Found: C, 65.84; H, 7.55; N, 21.96.

The tetrafluorocycloheptadiene mixture for the preceding was prepared according to the process of U.S. Patent 2,819,320 to J. J. Drysdale and of common assignment. To illustrate this preparation, which is more specifically disclosed in Example 1 of the aforementioned patent, the following example is offered:

The 6,6,7,7-tetrafluorobicyclo(3.2.0)-hept-2-ene used as starting material is prepared, as described in greater detail by Coffman et al. in J. Am. Chem. Soc. 71, 490 (1949), by the addition of tetrafluoroethylene to dicyclopentadiene at temperatures of about 190° C. under autogenous pressure in the presence of a polymerization inhibitor, such as hydroquinone. In addition to the 6,6,7,7-tetrafluorobicyclo(3.2.0)hept-2-ene, another reaction product of tetrafluoroethylene and cyclopentadiene, 5,5,6,6-tetrafluorobicyclo(2.2.1.)hept-2-ene, is formed as a Diels-Alder adduct of tetrafluoroethylene and cyclopentadiene. The presence of this isomer, however, does not interfere with the pyrolysis of 6,6,7,7-tetrafluoro bicyclo(3.2.0)-hept-2-ene to 1,1,2,2-tetrafluorocycloheptadienes, and therefore does not need to be separated from the 6,6,7,7-tetrafluorobicyclo(3.2.0)-hept-2-ene.

In this example the reactor consists of a heat resistant glass tube (the type of glass known commercially as "Vycor") of $1\frac{3}{16}$ inch inside diameter 20.5 inches long packed with 6 mm. sections of quartz tubing 6 mm. in diameter. The packed zone is 12 inches long. The packed section of the reaction tube is heated externally by means of a cylindrical electric resistance furnace, and the temperature is recorded by a thermocouple placed in the center of the reaction tube. A high capacity vacuum pump maintains the reaction system at the desired reduced pressure. The 6,6,7,7-tetrafluorobicyclo(3.2.0)-hept-2-ene reactant is introduced into the reaction zone gradually by conventional means, e.g., by a dropping funnel, and the reaction products are condensed in a trap which is cooled by a coolant capable of condensing byproducts at the pressure employed, e.g., liquid nitrogen.

Two hundred twenty-seven parts of the portion of the reaction mixture of tetrafluoroethylene and dicyclopentadiene boiling at 123–132° C. (obtained by the process of Coffman et al. mentioned previously) and containing a major proportion of 6,6,7,7-tetrafluorobicyclo-(3.2.0)-hept-2-ene is added slowly to a reaction tube of the type described in the paragraph above, which is maintained at 700° C.±15° C. at 2 mm. mercury pressure. After the addition is complete, about 120 minutes being required, the cold trap containing the reaction product is removed from the system and the low boiling by-products are allowed to evaporate at room temperature. The residue is then rapidly distilled and there is obtained 203 parts of a liquid reaction product. This reaction product can be fractionated in an efficient fractionating column to yield a mixture containing approximately 50% of the tetrafluorocycloheptadienes or may be used as such without any further separation. With respect to the position of the unsaturation in the tetrafluorocycloheptadiene, there appears to be no difference in yield or reaction product when either the conjugated or nonconjugated unsaturated ring compounds are used.

The compound of this example as well as the related new compounds can be more precisely named by specifying the boron substituents, e.g., B-ethoxy-B-phenyl-[7-imino-1,3,5-cycloheptatrienylamino]borine.

EXAMPLE II

*Dimethoxy-[7-Imino-1,3,5-Cycloheptatrienylamino] Borine*

A solution of 0.7 g. of 1-amino-7-imino-1,3,5-cycloheptatriene in 75 ml. of methyl borate and 25 ml. of benzene was stirred and refluxed for seven hours during which 36 ml. of distillate was withdrawn by means of an azeotropic separator. Cooling the residue gave 1.1 g. (100% yield) of a tan precipitate which was very slightly soluble in non-polar solvents to give fluorescent solutions. It was recrystallized twice by dissolution in methanol, addition of toluene, and evaporation of the methanol to give yellow-orange crystals of dimethoxy-[7-imino-1,3,5-cycloheptatrienylamino]borine which did not melt at 400°, but darkened at 250–350° C.

*Analysis.*—Calcd. for $C_9H_{13}O_2N_2B$: C, 56.30; H, 6.82; N, 14.59; B, 5.63. Found: C, 56.69; H, 6.84; N, 14.77, 14.61; B, 5.56.

EXAMPLE III

Di-n-Butyl-[7-Imino-1,3,5-Cycloheptatrienylamino] Borine

A solution of 1.5 g. of 1-amino-7-imino-1,3,5-cycloheptatriene hemihydrate and 4.0 g. of tri-n-butylborane in 75 ml. of dimethyl ether of diethylene glycol was refluxed for 20 hours under nitrogen. There was collected 323 ml. of n-butane corresponding to replacement of one butyl group by the iminocycloheptatrienylamino group. After removal of the solvent, petroleum ether was added to the concentrate to precipitate 0.6 g. of brown-noncrystalline solid, infusible at 300° C., which contained 8.3% N and 3.12% B.

EXAMPLE IV

Dimethoxy-[N-Methyl-N-(7-Methylimino-1,3,5-Cycloheptatrienyl)Amino]Borine

A solution of 10.3 g. of 1-methylamino-7-methylimino-1,3,5-cycloheptadiene in 100 ml. of methyl borate was refluxed for seven hours, cooled, and filtered. From the filtrate 5 g. of yellow dimethoxy-[N-methyl-N-(7-methylimino-1,3,5-cycloheptatrienyl)amino]borine was obtained which had an M.P. 127–129° C. It was purified by washing with petroleum ether and drying at <1 mm. for three days at room temperature.

*Analysis.*—Calcd. for $C_{11}H_{17}O_2N_2B$: C, 60.01; H, 7.79; N, 12.73; B, 4.92; mol. wt., 220. Found: C, 58.65, 59.06; H, 7.74, 7.79; N, 12.71, 12.71; B, 5.24; mol. wt., 230, 241.

Evaporation of the filtrate from the reaction mixture gave a second product (9.8 g.), probably a trimer formed by loss of the methoxyl groups through hydrolysis. The pure compound was obtained as yellow crystals by several recrystallizations from a methylene chloride-toluene mixture, M.P. 217–219° C. Its infrared spectrum indicates the presence of some —OH.

*Analysis.*—Found: C, 57.04; H, 5.93; N, 12.49; B, 7.31; mol. wt., 570, 590.

The same compound (M.P. 217–219° C.) was also obtained by the following: A mixture of 10 g. of 1-methylamino-7-methylimino-1,3,5-cycloheptatriene, 5 g. of boric acid, 10 g. of anhydrous calcium sulfate (drying agent), and 300 ml. of dioxane was stirred and refluxed for 22 hours and filtered to remove a solid. The filtrate gave 2.5 g. of yellow crystals, M.P. 217–219° C. The solid was leached with hot chloroform to give another 9.5 g. of product. The melting point of a mixture of this compound and that obtained by the above alternate procedure was not depressed.

The 1-methylamino-7-methylimino-1,3,5-cycloheptatriene employed was obtained by the following general procedure: A fluorocarbon solution of 16.6 parts containing 80% of 1,1,2,2-tetrafluorocycloheptadiene in 16 parts of ethyl alcohol was added during one-half hour to an ice-cooled solution of 35 parts of methylamine in 64 parts of ethyl alcohol. The reaction mixture was stirred overnight (12 hours) and poured onto 200 parts of ice with stirring to precipitate the bright yellow 1-methylamino-7-methylimino - 1,3,5 - cycloheptatriene. Recrystallization from methanol and water yielded 7.3 parts of a pure sample, M.P. 66.5–67° C.

*Analysis.*—Calcd. for $C_9H_{12}N_2$: C, 72.96; H, 8.17; N, 18.91; mol. wt., 148. Found: C, 73.05; H, 8.26; N, 18.92; mol. wt., 146, 147.

EXAMPLE V

Dihydroxy-[N-Methyl-N-(7-Methylimino-1,3,5-Cycloheptatrienyl)Amino]Borine

A solution of 3 g. of 1-methylamino-7-methylimino-1,3,5-cycloheptadiene in 30 ml. of methyl borate was refluxed for 20 hours, cooled, and filtered. From the filtrate immediately crystallized 2.2 g. (50%) of the dimethoxy compound, M.P. 125–130° C. (see Example IV for characterization). Recrystallization gave another yellow compound, M.P. about 220° C., probably a trimer through loss of methoxyl groups. A 0.7 g. sample of the high-melting material was dissolved in 15 ml. of methanol and 5 ml. of water and warmed on a steam bath for several hours to evaporate most of the methanol. Cooling gave crystals (0.3 g.) which were recrystallized from water to give yellow needles of dihydroxy-[N-methyl-N-(7-methylimino-1,3,5-cycloheptatrienyl)amino]borine, M.P. 68° C. (This melting point is obtained by rapid heating. Slow heating converts the compound through loss of water to the high-melting high molecular weight composition.)

*Analysis.*—Calcd. for $C_9H_{13}O_2N_2B$: C, 56.30; H, 6.82; N, 14.59. Found: C, 55.89; H, 6.88; N, 14.47.

The dihydroxy compound was also obtained by hydrolysis of the compound of M.P. 217–219° C. (Example IV) by 5% sodium hydroxide.

EXAMPLE VI

Ethoxyphenyl-[N-p-Methoxyphenyl-N-(7-(p-Methoxyphenylimino)-1,3,5-Cycloheptatrienyl)Amino]Borine A solution of 3 g. of 1-p-methoxyphenylamino-7-p-methoxyphenylimino-1,3,5-cycloheptatriene and 1.8 g. of diethyl benzeneboronate in 75 ml. of dry toluene was refluxed for 20 hours. The solution was concentrated by distillation under reduced pressure. The solid residue weighed 3.9 g. (93% yield) after recrystallization from methylene chloride-petroleum ether. After three more recrystallizations, orange needles of ethoxyphenyl-[N-p-methoxyphenyl - N - (7 - (p-methoxyphenylimino)-1,3,5-cycloheptatrienyl)amino]borine were obtained, M.P. 180–181° C.

*Analysis.*—Calcd. for $C_{29}H_{29}O_3N_2B$: C, 75.01; H, 6.32; N, 6.02; B, 2.33; mol. wt., 4.64. Found: C, 74.85; H, 6.51; N, 6.27; B, 1.61; mol. wt., 475, 491.

The 1 - (p-methoxyphenylamino)-7-(p-methoxyphenylimino)-1,3,5-cycloheptatriene was obtained by reacting 6.6 parts of tetrafluorocycloheptadiene mixture, 7.4 parts of p-methoxyaniline and 16 parts of ethanol by refluxing for five hours. After cooling in ice, the expected derivative, M.P. 112.5°–113° C., was obtained as red crystals.

EXAMPLE VII

Dihydroxy-[N-p-Methoxyphenyl - N - (7 - (p - Methoxyphenylimino) - 1,3,5 - Cycloheptatrienyl)Amino] Borine About 0.7 of ethoxyphenyl-[N-p-methoxyphenyl-N-(7-(p-methoxyphenylimino) - 1,3,5-cycloheptatrienyl)amino] borine (i.e., the product of Example VI) was warmed on a steam bath with 25 ml. of 5% hydrochloric acid and 10 ml. of ethanol. The undissolved portion was removed by filtration after a few hours. From the filtrate, crystals of an orange-red solid were obtained, M.P. 197–203° C., after recrystallization from chloroform-petroleum ether. The product was shown by infrared analysis to contain hydroxyl groups. Thus, the ethoxy and phenyl groups were both removed by hydrolysis.

*Analysis.*—Calcd. for $C_{21}H_{21}O_4N_2B$: C, 67.05; H, 5.63; N, 7.45. Found: C, 67.83; H, 6.03; N, 7.74, 7.71.

EXAMPLE VIII

*Ethoxyphenyl-[N-Benzyl-N-(7-Benzylimino-1,3,5-Cycloheptatrienyl)Amino]Borine*

1-benzylamino-7-benzylimino-1,3,5-cycloheptatriene (3 g.), 1.8 g. of diethyl benzeneboronate, and 75 ml. of dry toluene were refluxed for 17 hours, giving a fluorescent solution. The solvent was removed by distillation under reduced pressure to leave an oil which was dissolved in ethyl acetate-petroleum ether and then chilled to give 0.9 g. of a yellow solid, M.P. 108–114° C.

The substituted cycloheptatriene used above was obtained as follows:

To a stirred solution of 200 g. of benzylamine in 100 ml. of ethanol was added 25 g. of 5,5,6,6-tetrafluoro-1,3-cycloheptadiene over a period of 75 minutes. A little external cooling was needed to keep the temperature at 32–38° C. Stirring was continued for three hours, then the mixture was poured into 2 l. of ice water to give a yellow precipitate, weighing 6.6 g. after recrystallization from methanol. Extraction of the filtrate with ether gave another 14.5 g., bringing the total yield to 47%. Another recrystallization from methanol gave yellow transparent prisms, M.P. 81.5–82° C.

*Analysis.*—Calcd. for $C_{21}H_{20}N_2$: C, 83.96; H, 6.71; N, 9.33; mol. wt., 300. Found: C, 83,86; H, 6.74; N, 9.34, 9.78; Neut. Eq., 305.

EXAMPLE IX

*Hydrochloride of Hydroxyphenyl-[7-Imino-1,3,5-Cycloheptatrienylamino]Borine*

When 1.3 g. of the hemihydrate of 1-amino-7-imino-1,3,5-cycloheptatriene, 2.5 g. of phenyldichloroborane, and 100 ml. of dry toluene were mixed under a nitrogen atmosphere, an immediate precipitate formed. The mixture was stirred and refluxed for 20 hours, cooled, and filtered to give 2.6 g. (100% yield) of a gray crystalline solid, insoluble in hot methylene chloride, and infusible at 300° C.

*Analysis.*—Calcd. for $C_{13}H_{14}ON_2ClB$: C, 59.94; H, 5.42; N, 10.75; B, 4.15. Found: C, 59.90; H, 5.60; N, 9.50, 9.63; B, 4.29.

Alternatively, the compound of this example may be called the hydrochloride of B-hydroxy-B-phenyl-[7-imino-1,3,5-cycloheptatrienylamino]borine.

EXAMPLE X

*Reaction of Phenyldichloroborane With 1-Methylamino-7-Methylimino-1,3,5-Cycloheptatriene*

When 5 g. of 1-methylamino-7-methylimino-1,3,5-cycloheptatriene, 6 g. of phenyldichloroborane, and dry toluene (100 ml.) were mixed in a nitrogen atmosphere, an exothermic change occurred. The mixture was refluxed for 20 hours, and the solvent was removed by distillation under reduced pressure to leave 7.8 g. (80% yield) of product. When recrystallized from methylene chloride-petroleum ether without using decolorizing charcoal, a melting point of 163–164° C. is obtained, but if charcoal is used with rapid heating, melting is obtained at about 96–98° C. On slow heating, the latter compound reverts to the form melting at 163–164° C. Infrared spectrum is the same for both and indicates hydroxyl is present. The compound is probably the hydrochloride of hydroxyphenyl[N-methyl-N-(7-methylimino - 1,3,5 - cycloheptatrienyl)amino]borine, which may be called the hydrochloride of B-hydroxy-B-phenyl-[N-methyl-N-(7-methylimino-1,3,5-cycloheptatrienyl)amino]borine, although the hydrate of chlorophenyl-[N-methyl-N-(7-methylimino-1,3,5-cycloheptatrienyl)amino]borine, i.e., B-chloro-B-phenyl-[N - methyl - (7 - methylimino - 1,3,5 - cycloheptatrienyl) amino]borine has the same empirical formula.

*Analysis.*—Calcd. for $C_{15}H_{18}ON_2ClB$: C, 62.41; H, 6.28; N, 9.71; B, 3.75. Found (high-melting): C, 62.20; H, 6.34; N, 9.84, 9.95; B, 3.72. Found (low-melting): C, 62.00; H, 6.48; N, 9.69, 9.64; B, 4.15.

EXAMPLE XI

*Difluoro-[N-Methyl-N-(7-Methylimino-1,3,5-Cycloheptatrienyl)Amino]Borine*

A solution of 10 g. of 1-methylamino-7-methylimino-1,3,5-cycloheptatriene in 150 ml. of dioxane was placed in a stainless steel shaker tube of 400 ml. capacity. Then 5 g. of boron trifluoride with enough propylene to give a 200 atm. pressure at 100° C. was injected. The tube was shaken at 100° C. and 200 atm. for 16 hours. An olive-green solid (6.5 g.) was removed from the product by filtration. This was mostly the boron trifluoride salt of the starting material as shown by solution in water followed by addition of base to give the initial amine. The portion insoluble in water (0.28 g.) was twice recrystallized from methanol to give yellow needles of difluoro-[N-methyl-N-(7-methylimino - 1,3,5 - cycloheptatrienyl)-amino]borine, M.P. 117–117.5° C.

*Analysis.*—Calcd. for $C_9H_{11}N_2BF_2$: C, 55.14; H, 5.66; N, 13.40; B, 5.52; F, 19.38. Found: C, 54.85; H, 5.84; N, 14.28.

EXAMPLE XII

*Difluoro-[N-Methyl-N-(7-Methylimino-1,3,5-Cycloheptatrienyl)Amino]Borine*

A solution of 22.5 g. of 1-methylamino-7-methylimino-1,3,5-cycloheptatriene in 300 ml. of ethyl ether was treated with a stream of gaseous boron trifluoride for a few minutes. The yellow precipitated salt (20 g.) was collected by filtration. A 7 g. portion was stirred and refluxed with 5 g. of sodium fluoride and 225 ml. of diethylene glycol dimethyl ether for five hours. Most of the solvent was removed by distillation under reduced pressure and the residue filtered to remove 3.1 g. of unchanged salt which was washed with chloroform. The chloroform washing and filtrate were evaporated to give 1.0 g. of difluoro-[N-methyl-N-(7-methylimino-1,3,5-cycloheptatrienyl)amino]borine, M.P. 118° C. after recrystallization from methanol (19% yield at 56% conversion).

*Analysis.*—Found: B, 5.66; F, 19.81 (see Example XI).

Although the compounds in the preceding examples illustrate cycloheptatrienes having no further substituents on the cycloheptatriene ring, compounds having further relatively inert substituents are included in the scope of this invention. Thus, cycloheptatrienes having hydrocarbon radicals, such as methyl, attached to nuclear carbon are known. Particularly useful and available for the purpose of this invention are cycloheptatrienes substituted by 1 to 2 halogens, especially chlorine or bromine and sulfonic acid groups. The latter compounds in the form of amino-imines are available by chlorination, bromination or sulfonation of the imino-imine, e.g., brominated or sulfonated 1-(p-chlorophenylamino)-7-(p-chlorophenylimino) - 1,3,5 - cycloheptatriene wherein the cycloheptatriene ring carries one to two such substituents. The production of these compounds is disclosed in copending and coassigned application Serial No. 728,561 to Brasen and Howard.

New compounds embraced in this invention can be represented by the general structure:

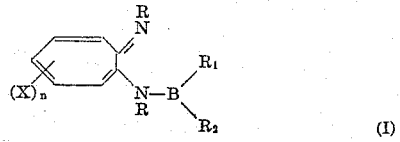

(I)

wherein X represents a substituent such as a chloro, bromo, or sulfo radicals, $n$ represents a cardinal number of up to 2, and R is hydrogen, aliphatically saturated hydrocarbon (preferably of not more than 10 carbons including lower alkyl, e.g., methyl, butyl; aralkyl, e.g., benzyl; aryl, e.g., phenyl, tolyl, and naphthyl), and the substituted derivatives thereof, particularly aryl radicals having an alkoxy, nitro, halo, sulfo, or lower dialkylamino group. $R_1$ and $R_2$ in the above formula represent alkyl and aryl hydrocarbon radicals of up to 10 carbons, e.g., ethyl, butyl, hexyl, tolyl, and naphthyl; alkoxyl, preferably lower alkoxyl, e.g., methoxyl, ethoxyl, butoxyl; and hydroxyl radicals. In addition to these groups, $R_1$ and $R_2$ can be halogen (preferably of atomic number of not over 35, i.e. 9–35). Most preferred because of ease of preparation are those wherein $n$ is zero.

Other 7-imino-1,3,5-cycloheptatrienyl amino compounds having borine directly bonded to amino nitrogen can be obtained by following the general procedure of the previous examples. Thus, using as the aminoimino cycloheptatriene reactant the compounds of the left hand column in Table I below, and as the boron reactant the compounds of the second column, one obtains the novel compounds of the invention as listed in the right hand column.

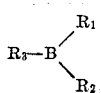

wherein $R_1$, $R_2$, and $R_3$ which may be the same or different, are selected from the group consisting of hydroxyl, alkoxyl (especially lower alkoxy such as n-butoxyl and isopropoxyl), halogen, and aliphatically saturated hydrocarbon preferably of not more than 10 carbons and including aryl, e.g., naphthyl and alkyl, e.g., methyl and hexyl. Halogens of atomic number of up to 35, i.e., fluorine, chlorine and bromine are preferred.

The reaction is conducted in liquid phase. Although some of the useful boron compounds are liquid, it is preferred that an inert solvent be present to dissolve the aminoiminocycloheptatriene. Solvents which are nonreactive under the conditions employed, such as hydrocarbons, particularly aromatic hydrocarbons, ethers, etc., are useful.

Although the starting materials react in a 1:1 molar ratio, the relative proportions used in the process are not critical. Usually a mol ratio of boron compound to cycloheptatriene in the range of .75 to 1.5 (boron compound) to 1 (cycloheptatriene) is employed. Much

TABLE I

| | | |
|---|---|---|
| 1 - (phenylamino) - 7 - (phenylimino) - 1, 3, 5 - cycloheptatriene. | boron trifluoride | difluoro - [N - phenyl - N - (7 - phenyl - imino - 1, 3, 5 - cycloheptatrienyl) amino]borine. |
| 1 - (p - nitrophenylamino) - 7 - (p - nitrophenylimino)-1,3,5-cycloheptatriene. | methyl borate | dimethoxy[N - p - nitrophenyl - N -)7 - p - nitrophenylimino - 1, 3, 5 - cyclo - heptatrienyl)amino]borine. |
| 1 - (p - sulfophenylamino) - 7 - (p - sulfophenylimino)-1,3,5-cycloheptatriene. | tri - n - butyl borane | di - n - butyl - [N - p - sulfophenyl - N - (7 - p - sulfophenylimino - 1, 3, 5 - cyclo-heptatrienyl)amino]borine. |
| 1 - (p - dimethylaminophenylamino) - 7 - (p - dimethylaminophenylimino) - 1, 3, 5- cycloheptatriene. | methyl borate | dimethoxy - [N - p - dimethylamino - phenyl - N - (7 - p - dimethylamino - phenylimino - 1, 3, 5 - cyclohepta - trienyl)amino]borine. |
| 1 - (p - chlorophenylamino) - 4 - sulfo - 7 - (p - chlorophenylimino)-1,3,5-cycloheptatriene. | tri-n-butyl borane | di-n-butyl-[N-p-chlorophenyl-N - (7 - p - chlorophenylimino - 4 - sulfo - 1, 3, 5 - cycloheptatrienyl)amino] - borine. |
| 1 - cyclohexylamino - 7 - cyclohexylimino - 1,3,5-cycloheptatriene. | boron trifluoride | difluoro - [N - cyclohexyl - N - (7 - cyclohexylimino - 1, 3, 5 - cyclohepta - trienyl)amino]borine. |
| 1 - n - decylamino - 7-n - decylimino 1, 3, 5 - cycloheptatriene. | boron trifluoride | difluoro[N - n - decyl - N - (7-n - decyl - imino - 1, 3, 5 - cycloheptatrienyl)- amino]borine. |

Although these new boron-containing cycloheptatrienylamino compounds have been named corresponding to the above structure (Formula I), the unusual stability of boron in the molecule indicates that both nitrogen and boron may be involved in bonding forming a heterocyclic ring. Such compounds would have the 2,3-dihydro-2-bora-1,3-diazaazulene structure (II) represented by the following:

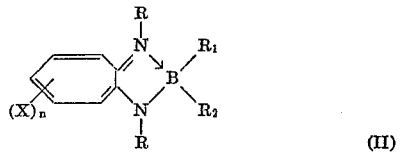

(II)

wherein the symbols have the meanings described above.

The new boron-containing aminocycloheptatrienes are obtained by reaction of a 1-amino-7-imino-1,3,5-cycloheptatriene of the formula

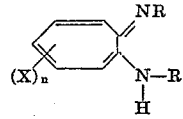

where the symbols X and R having the same meaning as disclosed above, with a trivalent boron compound, and in particular, boric acid, boron halides, or an organo boron compound, e.g., boric esters. The boron compounds most useful can be represented by the formula larger amounts of boron compound may be used as where it also serves as the reaction medium.

The reaction is generally carried out at 60–125° C., although this is not critical and lower or higher temperatures can be employed. When higher temperatures are used, pressure equipment may be desired to prevent loss of reactants, particularly if the boron compound employed boils at the reaction temperature chosen. The reaction conditions selected depend upon the reactivity of the aminocycloheptatriene and the boron compound. The reaction usually takes place quicker and at lower temperatures when the amino compound is relatively basic, e.g., has a pKb of preferably less than 9.

The time required for the reaction is generally dependent upon the temperature and specific reactants. In general, times of from an hour to a day are sufficient to produce the desired reaction.

The new boron-substituted aminocycloheptatrienyl compounds are isolated by usual techniques, i.e., removal from solvent by evaporation of the solvent or by crystallization from the solvent. Purification is usually achieved by crystallization.

The new compounds of this invention are solid compounds which are generally yellowish to orange in color. They can be dissolved in hydrocarbon fuel to form a yellowish solution. They exhibit fluorescence. They are thus useful as dyes for fuel oil, such as gasoline, or lubricating oils. The products of Examples IV and VI dissolved in liquid gasoline to the extent of about 1 mg. per 2 ml. gave it a distinctive orange coloration.

The compounds can be used as dyes. About 0.75 g. of the product of Example VI was combined with 100 ml. of water, 0.17 g. benzoic acid and 0.35 g. polyvinyl alcohol dispersant which was then heated to boiling. Swatches of acetate fabric and wool were added to the hot mixture which was maintained near the boiling point for an hour to produce the dyed fabric. The acetate fabric was dyed golden yellow and the wool assumed a buff color. The colors were resistant to ten minutes of heating with detergent.

An unexpected property exhibited by the new boron compounds of this invention is the difficulty of removal of borons by hydrolysis compared to other organoboron compounds. These new compounds are generally stable to moisture in the air.

New boron compounds of this invention can be converted to polymers with glycols as shown by the following two examples.

EXAMPLE A

A mixture of 1.92 g. of the boric acid condensation product with 1-methylamino-7-methylimino-1,3,5-cycloheptatriene (see second part of Example IV), 1.18 g. of 1,6-hexanediol, and 15 ml. of benzene was refluxed under a 12″ spinning band column for three hours. The column temperature rose to 80° (B.P. of benzene), then fell to 69° (B.P. of benzene-water azeotrope). Ten ml. of distillate, B.P. 69–80°, was collected. A viscous orange polymer separated from the residue. Another 15 ml. of benzene was added and distilled out over a 90-minute period, but no more water was collected. The residue was dried under reduced pressure to give a tough, flexible, yellow, slightly sticky polymer, $\eta_{inh}$. 2.72 at 0.1% in benzene at 25°.

EXAMPLE B

A solution of 2.0306 g. of dimethoxy-[N-methyl-N-(7-methylimino - 1,3,5 - cycloheptatrienyl)amino]borine (see Example IV) and 1.3490 g. of 1,8-octanediol in 65 ml. of nitrogen-flushed benzene was stirred and refluxed under a spinning band column under slight nitrogen pressure. The boiling point soon fell from 80° to 58° and some distillate was collected until the boiling point again reached 80° C. The temperature then again fell to 58° and the remainder of the solvent was distilled out. The yellow tacky residue was dried at 1 mm. pressure. A portion of the yellow solid was sealed with tape between two sheets of aluminum foil in a nitrogen atmosphere and pressed at 100° and 12,000 lb./sq. in. for five minutes. The aluminum sheets adhered together and could be separated with great difficulty, demonstrating the utility of the polymer as an adhesive for bonding metals.

What is claimed is:

1. A compound represented by the following structural formula:

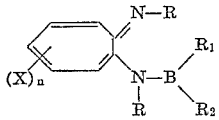

wherein X represents a member of the group consisting of chloro, bromo and sulfo radicals; $n$ represents a cardinal number of up to 2; R represents a member of the group consisting of hydrogen, aliphatically saturated hydrocarbon of up to 10 carbons and the lower alkoxy, halo of atomic number 9–35, nitro, sulfo, and lower dialkylamino derivatives thereof; $R_1$ and $R_2$ each represent a member of the group consisting of aliphatically saturated hydrocarbon of up to 10 carbons, lower alkoxy, hydroxyl and halogen of atomic number 9–35.

2. The compound of claim 1 wherein $n$ is zero, R is hydrocarbon and $R_1$ and $R_2$ are lower alkoxy.

3. The compound of claim 1 wherein $n$ is zero, R is aliphatically saturated hydrocarbon and $R_1$ and $R_2$ are halogen of atomic number 9–35.

4. The compound of claim 1 wherein $n$ is zero and R, $R_1$, and $R_2$ are aliphatically saturated hydrocarbon.

5. The compound of claim 1 wherein $n$ is zero, R is hydrogen and $R_1$ and $R_2$ are aliphatically saturated hydrocarbon.

6. The compound of claim 1 wherein $n$ is zero, R is hydrogen and $R_1$ and $R_2$ are lower alkoxy.

7. Dimethoxy - [7 - imino - 1,3,5 - cycloheptatrienylamino]borine.

8. Di - n - butyl[7 - imino - 1,3,5 - cycloheptatrienylamino]borine.

9. Difluoro - [N - methyl - N - (7 - methylimino - 1,3,5-cycloheptatrienyl)amino]borine.

10. A method of preparing boron-containing derivatives of cycloheptatriene which comprises contacting in the liquid phase at a temperature of 60–125° C. a cycloheptatriene of the formula:

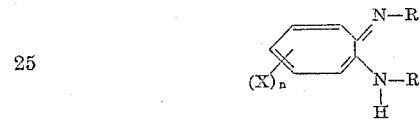

wherein R is selected from the group consisting of hydrogen, aliphatically saturated hydrocarbon of up to 10 carbons, and the lower alkoxy, nitro, halo of atomic number 9–35, sulfo and lower dialkylamino derivatives thereof; X is selected from the group consisting of chloro, bromo and sulfo; and $n$ is a cardinal number of up to 2, with a boron compound of the formula:

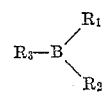

wherein $R_1$, $R_2$ and $R_3$ are selected from the group consisting of hydroxyl, lower alkoxy, halogen of atomic number 9–35 and aliphatically saturated hydrocarbon of up to 10 carbons, the mole ratio of boron compound to cycloheptatriene being at least 0.75:1.

11. The method of claim 10 wherein the boron compound used is boron trifluoride.

12. The method of claim 10 wherein the boron compound used is methyl borate.

13. The method of claim 10 wherein the boron compound used is tri-n-butylborane.

14. A method of preparing dimethoxy-[7-imino-1,3,5-cycloheptatrienylamino]borine which comprises contacting 1-amino-7-imino-1,3,5-cycloheptatriene with methyl borate in the liquid phase at a temperature of 60–125° C., the mole ratio of borate to cycloheptatriene being at least 0.75:1.

15. A method of preparing di-n-butyl-[7-imino-1,3,5-cycloheptatrienylamino]borine which comprises contacting 1 - amino - 7 - imino - 1,3,5 - cycloheptatriene with tri-n-butylborane in the liquid phase at a temperature of 60–125° C., the mole ratio of borane to cycloheptatriene being at least 0.75:1.

16. A process of preparing difluoro-[N-methyl-N-(7-methylimino-1,3,5-cycloheptatrienyl)amino]borine which comprises contacting 1-methylamino-7-methylimino-1,3,5-cycloheptatriene with boron trifluoride in the liquid phase at a temperature of 60–125° C., the mole ratio of boron trifluoride to cycloheptatriene being at least 0.75:1.

References Cited in the file of this patent

UNITED STATES PATENTS 2,408,332    Morgan _____ Sept. 24, 1946